United States Patent Office 3,682,887
Patented Aug. 8, 1972

3,682,887
2-(ALK-2-ENYLTHIO)INOSINE-5'-PHOSPHATE DERIVATIVES
Yoshio Yoshioka, Osaka, and Kinichi Imai, Hisashi Aoki, and Jun Toda, Osaka-fu, Japan, assignors to Takeda Chemical Industries, Ltd., Osaka, Japan
No Drawing. Filed Oct. 2, 1969, Ser. No. 863,332
Claims priority, application Japan, Oct. 2, 1968, 43/71,656; Oct. 5, 1968, 43/72,557; June 11, 1969, 44/45,996; June 24, 1969, 44/49,831
Int. Cl. C07d 51/54
U.S. Cl. 260—211.5 R
9 Claims

ABSTRACT OF THE DISCLOSURE

A 2 - (alk - 2 - enylthio)inosine-5'-phosphate whose alk-2-enyl group is represented by the formula

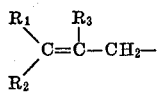

wherein $R_1$, $R_2$ and $R_3$ represent a hydrogen atom or methyl group has excellent ability for improving and/or enhancing the flavor of foods and beverages. Moreover, there is a significant synergistic action between these compounds and monosodium glutamate. Also provided are novel starting materials for preparing these compounds.

---

This invention relates to novel seasoning compounds and compositions, a method for preparing such compounds and compositions and a method for improving or enhancing the flavor of foods and beverages. This invention also concerns novel compounds to be utilized in preparing the seasoning compounds.

5'-purinenucleotides such as 5'-inosinic acid and 5'-guanylic acid, usually in the form of disodium salts, have been employed in practice as chemical condiments because of their strong flavor-enhancing effect (see French Pats., Nos. 1,219,220 and 1,255,334).

It has been found by the present inventors that 2-(alk-2-enylthio)inosine-5'-phosphates whose alk-2-enyl group is represented by the formula

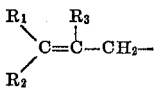

wherein $R_1$, $R_2$ and $R_3$ stand for a hydrogen atom or methyl group, all of these compounds being novel compounds, have a much greater ability for improving or enhancing the flavor or foods or beverages than compounds of 5'-inosinic acid and 5'-guanylic acid.

It has further been found that there is a significant synergistic action between the 2-(alk-2-enylthio)inosine-5'-phosphates and monosodium glutamate.

It is an object of the present invention to provide novel compounds and novel seasoning compositions prepared therefrom. Another object of the present invention is to provide a method for producing the compounds and a method for preparing the seasoning compositions. A further object of the present invention is to provide a method for improving or enhancing the flavor of foods and beverages.

As the alk-2-enyl group of the 2-(alk-2-enylthio)-inosine-5'-phosphates there are the allyl, 3-methylbut-2-enyl, but-2-enyl, 2-methylprop-2-enyl, 2-methyl-but-2-enyl and 2,3-dimethyl-but-2-enyl groups.

The 2(alk-2-enylthio)inosine-5'-phosphates are prepared, for example, by reacting the corresponding 2-(alk-2-enylthio)inosine or 2-(alk-2-enylthio)-2',3'-isopropylideneinosine with a phosphorylating agent, and subjecting the resultant product to hydrolysis. The phosphorylation and the subsequent hydrolysis may be effected, for example, by either of the following methods:

(A) The corresponding 2 - (alk - 2-enylthio)-2',3'-isopropylideneinosine is reacted with a phosphorylating agent. As the phosphorylating agent, there may be employed for example a phosphoric acid halide such as pyrophosphoryl tetrachloride, phosphoryl chloride or partially hydrolyzed phosphoryl chloride. The phosphorylation reaction proceeds smoothly at a temperature of from about —25° to about 30° C., especially from about 0° to about 10° C. When a reaction solvent is required, a conventional organic solvent such as dioxane or pyridine is employed. The hydrolysis of the resultant product is carried out by per se known procedure, for example, by weakening the acidity of the reaction mixture, preferably to about pH 1 to 2 with the addition of an alkaline material such as sodium hydroxide or sodium carbonate, and heating the mixture at a temperature of from about 60° C. to about 80° C. for 15 to 60 minutes to give a 2-(alk-2-enylthio)inosine-5'-phosphate.

(B) The corresponding 2-(alk-2-enylthio)inosine is reacted directly with a phosphorylating agent. In this case, employment of phenols, e.g. phenol, cresol and xylenol, or carbonitriles, e.g. acetonitrile and benzonitrile as the reaction solvent, and pyrophosphoryl tetrachloride as the phosphorylating agent, gives optimum results. The reaction proceeds smoothly at a temperature of from about —25° to about 30° C., especially from about 0° to about 10° C. The resultant product is hydrolyzed in a simple conventional manner, for example, by pouring the reaction mixture into water, preferably cool water, to give a 2-alk-2-enylthio)inosine-5'-phosphate.

The 2-(alk-2-enylthio)inosines and 2-(alk-2-enylthio)-2',3'-isopropylideneinosines to be employed as the starting materials are novel compounds. They may be prepared, for example, by reacting an alkali metal salt (e.g. sodium salt, potassium salt) or ammonium salt of 2-mercaptoinosine or 2-mercapto-2',3'-isopropylideneinosine with a halide of the corresponding alk-2-enyl compound such as allyl chloride, 1-bromo-3-methyl-2-butene, 1-chloro-2-butene or 1-chloro-2-methyl-2-propene. The reaction proceeds smoothly at room temperature (15° to 30° C.) in a solvent. As the solvent, there may preferably be employed methyl alcohol, a mixture of methyl alcohol and water, and the like.

For the purpose of this invention, the 2-(alk-2-enylthio)inosine-5'-phosphates thus obtained may be employed in their free form or as a physiologically acceptable salt, such as an alakli metal salt (e.g. sodium or potassium), an alkaline earth metal salt (e.g. calcium or magnesium), an ammonium salt or a non-toxic amine salt such as the cyclohexylamine salt.

The respective threshold values in water of the 2-(alk-2-enylthio)inosine-5'-phosphate of the present invention, determined by "The Forced Choice Method of Limits" described in American Journal of Psychology, vol. 69, pp. 672–673 are as follows:

| Compound: | Threshold value, percent in water |
|---|---|
| Disodium 2-allylthioinosine-5'-phosphate | 0.002 |
| Disodium 2 - (3-methylbut-2-enylthio)-inosine-5'-phosphate | 0.0001 |
| Disodium 2-(but-2-enylthio)inosine-5'-phosphate | 0.0006 |
| Disodium 2-(2-methylprop-2-enylthio)-inosine-5'-phosphate | 0.0027 |

As clearly shown in the above table, the respective threshold values of the 2-(alk-2-enylthio)inosine-5'-phosphates are far lower than that (0.02%) of disodium 5'-inosinate, which illustrates that these compounds can be detected at a lower concentration than 5′-inosinic acid. Further, as mentioned hereinbefore, when the 2-(alk-2-enylthio)inosine-5′-phosphates are employed in combination with monosodium glutamate, a remarkable synergistic action is exhibited between these compounds and the monosodium glutamate. As clearly shown in tests described hereinafter, in the co-presence of monosodium glutamate, the flavor-enhancing effect of the 2-(alk-2-enylthio)inosine-5′-phosphates is about 10 to 11 times as strong as that of 5′-inosinic acid.

It is also known that 2-methylthioinosine-5′-phosphate and 2-ethylthioinosine-5′-phosphate show, in the co-presence of monosodium glutamate, a flavor-enhancing effect of 8.0 and 7.5 times as strong as that of 5′-inosinic acid, respectively (Agricultural and Biological Chemistry, vol. 32, pp. 797–802 (1968)). The 2-(alk-2-enylthio)inosine-5′-phosphates of the present invention exhibit a greater strong flavor-enhancing effect than the known 5′-inosinic acid derivatives.

Furthermore, the 2-(alk-2-enylthio)inosine-5′-phosphates are characterized by the following excellent properties:

(1) Not only are they chemically stable but they are relatively stable against phosphatases.
(2) They are non-toxic to mammals.
(3) They can be dissolved in various kinds of edible organic solvents or edible oils and fats.
(4) They can be employed as one of the various kinds of physiologically acceptable salts.

The 2-(alk-2-enylthio)inosine-5′-phosphates may be added to foods or beverages in a solid state or in a liquid state, i.e. dissolved in water or a palatable and edible organic solvent, e.g. alcohol. In improving or enhancing the flavor of foods or beverages, the foods or beverages are mixed with one or more of the 2-(alk-2-enylthio)inosine-5′-phosphates, or are impregnated with a solution of one or more of the 2-(alk-2-enylthio)inosine-5′-phosphates, or the solution is sprinkled over the food. The addition of one or more of the 2-(alk-2-enylthio)inosine-5′-phosphates is carried out during or after the preparation of the foods or beverages.

Foods or beverages to be seasoned include, for example, fermented foods such as bean paste (Miso), soy sauce, vinegar or Sake, paste such as ham, sausage, steamed fish paste (Kamaboko or Chikuwa), meats such as whale meat, poultry meat, pork or beef, noodles such as macaroni, milk and its processed products such as cow milk, condensed milk or cheese, processed vegetables such as tomato juice or canned spinach, and cooked foods such as soups or stews.

In most cases, it is preferable to employ the 2-(alk-2-enylthio)inosine-5′-phosphates together with monosodium glutamate, and if desired, other chemical condiments such as disodium 5′-guanylate, sodium aspartate or sodium succinate. The ratio of the 2-(alk-2-enylthio)inosine-5′-phosphates to the monosodium glutamate is advantageously from about 1/1000 to about 1/10 by weight.

The preparation of the seasoning composition comprising one or more of the 2-(alk-2-enylthio)inosine-5′-phosphates and monosodium glutamate may be carried out by simple mixing, or by preparing a base material of either the 2-(alk-2-enylthio)inosine-5′-phosphate or the monosodium glutamate and successively adhering the other component to the base material. If desired, a composition of the 2-(alk-2-enylthio)inosine-5′-phosphate and monosodium glutamate, irrespective of whether it is powdery or granular, may be coated with a known coating agent. Aliphatic acid esters of sugars, e.g. sucrose fatty acid ester, gelatin, casein, edible waxes, stearic acid, vegetable proteins, monoglycerides and the like may be used as the coating agent.

The most effective amount of the 2-(alk-2-enylthio)inosine-5′-phosphate to be employed varies with the kinds of foods or beverages, but generally from about 0.0001 to 0.01% relative to the weight of the foods or beverages as served is preferable.

In the instant specification and claims, percentages are by weight except in the case where the meaning is clearly otherwise from the context. Parts by volume bear the same relationship to parts by weight as do milliliters to grams. The "two-sample directional test," "constant method" and "probit analysis" employed in the following tests are those described in Principles of Sensory Evaluation of Food published by Academic Press, New York and London, 1965, pp. 330–332, Psychometric Methods, 2nd edition, published by McGraw-Hill Book Company, Inc., New York, pp. 118–41, and Probit Analysis, a Statistical Treatment of the Sigmoid Response Curve published by Cambridge Univ. Press in 1952, respectively.

TEST 1

Sample A: an aqueous solution containing 0.8% of sodium chloride plus 0.02% of disodium 2-allylthioinosine-5′-phosphate.

Sample B: an aqueous solution containing 0.8% of sodium chloride plus 0.02% of disodium 5′-inosinate.

The two-sample directional tests were conducted between Sample A and Sample B, wherein 20 out of 20 persons judged the flavor of Sample A to be stronger than that of Sample B (significant at the 0.1% level).

TEST 2

Sample C: an aqueous solution containing 1% of soy sauce, 0.6% of sodium chloride plus 0.001% of disodium 2-allylthioinosine-5′-phosphate.

Sample D: an aqueous solution of the same composition as Sample C except that 0.001% of disodium 2-allylthioinosine - 5′ - phosphate is replaced by the same amount of disodium 5′-inosinate.

The two-sample directional tests were conducted between Sample C and Sample D, wherein 19 out of 20 persons judged the flavor or Sample C to be stronger than that of Sample D (significant at the 0.1% level).

TEST 3

Sample E: an aqueous solution containing 1% of sodium chloride plus 0.1% of monosodium glutamate.

Sample F: an aqueous solution containing 1% of sodium chloride plus 0.1% of monosodium glutamate and 0.001% of disodium 5′-inosinate.

Sample G: an aqueous solution containing 1% of sodium chloride plus 0.1% of monosodium glutamate and 0.001% of disodium 2-allylthioinosine-5′-phosphate.

"Rank order methods" (Food Technology, vol. 14, pp. 576–81 (1960)) were carried out using Samples E to G (Panel: 20 persons). The results are summarized in Table 1.

TABLE 1

|  | Sample | | |
| --- | --- | --- | --- |
|  | E | F | G |
| Number of persons who gave the first rank | 0 | 2 | 18 |
| Number of persons who gave the second rank | 3 | 15 | 2 |
| Number of persons who gave the third rank | 17 | 3 | 0 |
| Rank sum | 57 | 41 | 22 |

The analysis of the above-mentioned results by Kramer's Table described in Food Technology, vol. 17, pp. 1596–97 (1963) revealed that the flavor of Sample G is stronger than the other samples, i.e. Samples E and F (significant at the 1% level) and that the flavor of Sample E is weaker than the other samples, i.e. Samples F and G (significant at the 1% level).

To compare quantitatively the flavor-enhancing effect of specific 2 - (alk - 2 - enylthio)inosine-5′-phosphates with that of disodium 5′-inosinate, further tests as shown in Tests 4 to 7 were carried out in accordance with the "constant methods" (panel: 50 persons for Test 4 and 25 persons for Tests 5 to 7) in which Sample S is a standard sample and the Samples 1 to 5 are variable ones. The concentration of disodium 5'-inosinate equivalent to Sample S in flavor-enhancing effect was determined by the application of the probit analysis to the resulting data.

TEST 4

Samples and results—

Sample S:
Sodium chloride percent _____ 1.0
Monosodium glutamate percent _____ 0.05
Disodium 2-allylthioinosine - 5' - phosphate percent _____ 0.0004

| Sample: | Sodium chloride, percent | Monosodium glutamate, percent | Disodium 5'-inosinate, percent | Number of persons who judged the flavor of Sample S to be stronger in comparison with Samples 1 to 5 |
|---|---|---|---|---|
| 1 | 1.0 | 0.05 | 0.00219 | 46 (92%) |
| 2 | 1.0 | 0.05 | 0.00296 | 40 (80%) |
| 3 | 1.0 | 0.05 | 0.00400 | 32 (64%) |
| 4 | 1.0 | 0.05 | 0.00540 | 10 (20%) |
| 5 | 1.0 | 0.05 | 0.00729 | 2 (4%) |

The probit analysis, when applied to the above-mentioned results, revealed that 0.0004% of disodium 2-allylthioinosine - 5' - phosphate is equivalent to 0.0041% of disodium 5'-inosinate in its flavor-enhancing effect, and therefore that the flavor-enhancing effect of disodium 2-allyl-thioinosine - 5' - phosphate is about 10.3 times as strong as that of disodium 5'-inosinate.

TEST 5

Samples and results—

Sample S:
Sodium chloride percent _____ 1.0
Monosodium glutamate percent _____ 0.05
Calcium 2 - (3 - methylbut - 2 - enylthio)-inosine - 5' - phosphate percent _____ 0.0004

| Sample: | Sodium chloride, percent | Monosodium glutamate, percent | Disodium 5'-inosinate, percent | Number of persons who judged the flavor of Sample S to be stronger in comparison with Samples 1 to 5 |
|---|---|---|---|---|
| 1 | 1.0 | 0.05 | 0.00219 | 21 (84%) |
| 2 | 1.0 | 0.05 | 0.00296 | 16 (64%) |
| 3 | 1.0 | 0.05 | 0.00400 | 15 (60%) |
| 4 | 1.0 | 0.05 | 0.00540 | 11 (44%) |
| 5 | 1.0 | 0.05 | 0.00729 | 5 (20%) |

The probit analysis, when applied to the above-mentioned results, revealed that 0.0004% of disodium 2-allyl-methylbut - 2 - enylthio)inosine - 5' - phosphate is equivalent to 0.00443% of disodium 5'-inosinate in its flavor-enhancing effect, and therefore that the flavor-enchancing effect of calcium 2-(3 - methylbut - 2 - enylthio-inosine - 5' - phosphate is about 11 times as strong as that of disodium 5'-inosinate.

TEST 6

Sample S

Samples and results: Percent
Sodium chloride _____ 1.0
Monosodium glutamate _____ 0.1
Disodium 2 - (2 - methylprop - 2 - enylthio) inosine-5'-phosphate _____ 0.00025

TEST 6

| Sample: | Sodium chloride, percent | Monosodium glutamate, percent | Disodium 5'-inosinate, percent | Number of persons who judged the flavor of Sample S to be stronger in comparison with Samples 1 to 5 |
|---|---|---|---|---|
| 1 | 1.0 | 0.1 | 0.00110 | 22 (88%) |
| 2 | 1.0 | 0.1 | 0.00148 | 22 (88%) |
| 3 | 1.0 | 0.1 | 0.00200 | 17 (68%) |
| 4 | 1.0 | 0.1 | 0.00270 | 11 (44%) |
| 5 | 1.0 | 0.1 | 0.00365 | 5 (20%) |

The probit analysis when applied to the above-mentioned results, revealed that 0.00025% of disodium 2-(2-methylprop-2-enythio)inosine-5'-phosphate is equivalent to 0.00249% of disodium 5'-inosinate in its flavor-enhancing effect, and therefore that the flavor-enhancing effect of disodium 2-(2-methylprop-2-enylthio)inosine-5'-phosphate is about 10 times as strong as that of disodium 5'-inosinate.

TEST 7

Sample S

Samples and results: Percent
Sodium chloride _____ 1.0
Monosodium glutamate _____ 0.05
Disodium 2-(but-2-enylthio)inosine-5'-phosphate _____ 0.0005

| Sample: | Sodium chloride, percent | Monosodium glutamate, percent | Disodium 5'-inosinate, percent | Number of persons who judged the flavor of Sample S to be stronger in comparison with Samples 1 to 5 |
|---|---|---|---|---|
| 1 | 1.0 | 0.05 | 0.00219 | 20 (80%) |
| 2 | 1.0 | 0.05 | 0.00296 | 21 (84%) |
| 3 | 1.0 | 0.05 | 0.00400 | 16 (64%) |
| 4 | 1.0 | 0.05 | 0.00540 | 14 (56%) |
| 5 | 1.0 | 0.05 | 0.00729 | 8 (32%) |

The probit analysis, when applied to the above-mentioned results, revealed that 0.0005% of disodium 2-(but-2-enylthio)inosine-5'-phosphate is equivalent to 0.00549% of disodium 5'-inosinate in its flavor-enhancing effect, and therefore that the flavor-enhancing effect of disodium 2-(but-2-enylthio)inosine-5'-phosphate is about 11 times as strong as that of disodium 5'-inosinate.

Example 1

To a suspension of 5.46 parts by weight of potassium 2-mercaptoinosine in a mixture of 25 parts by volume of water and 25 parts by volume of methanol, is added 1.6 parts by volume of allyl iodide and the mixture is kept standing while stirring at room temperature for one hour to give crystals. The crystals are recrystallized from hot water (about 100° C.) to yield colorless needles of 2-allylthioinosine melting at 190–192° C. The yield is 3.94 parts by weight.

1.02 parts by weight of the thus prepared 2-allylthioinosine is suspended in 80 parts by volume of metacresol. Into the resultant suspension is added dropwise with stirring and ice-cooling (0°–10° C.) 3 parts by volume of pyrophosphoryl tetrachloride. The mixture is kept standing while stirring at the same temperature for 2 hours.

The reaction mixture is poured into 300 parts by volume of ice water and the whole mixture is shaken with 300 parts by volume of diethyl ether to transfer the metacresol into the resulting diethyl ether layer. The aqueous layer is adjusted to pH 2 with 1 N sodium hydroxide. The aqueous layer is allowed to pass through a column packed with 10 parts by weight of activated carbon. The column is washed with water and is subjected to elution with 200 parts by volume of a mixture of n-butyl alcohol, ethyl alcohol, 28% aqueous ammonia and water (5:45:2:48 by volume). To the eluate is added 4.2 parts by volume of 1 N sodium hydroxide and the eluate is subjected to evaporation to dryness to give a syrupy residue. The residue is dissolved in 2 parts by volume of water and to the solution are added 2.5 parts by volume of methyl alcohol and 0.3 part by volume of acetone. The mixture is kept standing at 5° C. for 12 hours to yield colorless needles of disodium 2-allylthioinosine-5'-phosphate. The yield is 1.1 parts by weight.

*Elementary analysis.*—Calculated for $$C_{13}H_{15}N_4O_8PSNa_2 \cdot 3\tfrac{1}{2}H_2O$$

(percent): C, 29.61; H, 4.21; N, 10.61; P, 5.88; S, 6.08. Found (percent): C, 29.50; H, 4.47; N, 10.62; P, 5.84; S, 6.44.

Specific rotation:

$$[\alpha]_D^{22} = -12.8° \ (c.=1, \text{water})$$

Ultraviolet absorption:

$$\lambda_{\max.}^{0.1\,N\,HCl}\ 271\ m\mu\ (\epsilon\ 15{,}200)$$

$$\lambda_{\min.}^{0.1\,N\,HCl}\ 240\ m\mu$$

$$\lambda_{\max.}^{H_2O}\ 263\ m\mu\ (\epsilon\ 13{,}900),\ 283\ m\mu\ (\text{shoulder})$$

$$\lambda_{\min.}^{H_2O}\ 235\ m\mu$$

$$\lambda_{\max.}^{0.1\,N\,NaOH}\ 226.5\ m\mu\ (\epsilon\ 19{,}400),\ 272\ m\mu\ (\epsilon\ 14{,}500)$$

$$\lambda_{\min.}^{0.1\,N\,NaOH}\ 247\ m\mu$$

This product gives a single ultraviolet absorption spot at a migration distance of 1.5 times that of 2-allylthioinosine in paper electrophoresis (0.05 M borate buffer, pH 9.2) and gives a single ultraviolet absorption spot at Rf 0.46 in paper chromatography (developer: a mixture of isopropyl alcohol, 28% aqueous ammonia and water (7:1:2 by volume), ascending method).

Example 2

To a suspension of 16 parts by weight of potassium 2-mercaptoinosine in 187 parts by volume of methyl alcohol, is added 7.8 parts by volume of 1-bromo-3-methyl-2-butene and the mixture is kept standing while stirring at room temperature for 1.5 hours. The reaction mixture is subjected to evaporation to dryness. To the residue is added 100 parts by volume of water to give crystals. The crystals are recrystallized from 100 parts by volume of ethyl alcohol to yield colorless needles of 2-(3-methylbut-2-enylthio)-inosine melting at 193°–195° C. The yield is 10.25 parts by weight.

2 parts by weight of the thus prepared 2-(3-methylbut-2-enylthio)inosine is suspended in 240 parts by volume of acetonitrile. Into the resultant suspension is added dropwise with stirring and ice-cooling (0°–10° C.) 2.8 parts by volume of pyrophosphoryl tetrachloride. The mixture is kept standing at the same temperature for 2 hours.

The reaction mixture is poured into 1,500 parts by volume of ice water. The mixture is adjusted to pH 2 with 4 N sodium hydroxide and is allowed to pass through a column packed with 30 parts by weight of activated carbon. The column is washed with water and is subjected to elution with 600 parts by volume of a mixture of ethyl alcohol, 28% aqueous ammonia and water (50:2:48 by volume). The eluate is concentrated under reduced pressure to 50 parts by volume. The concentrate is allowed to pass through a column packed with 310 parts by volume of diethylaminoethyl cellulose (an ion exchanger under the trade mark "DEAE-cellulose," Cl⁻ type). The column is washed with water and is subjected to elution with 1960 parts by volume of 0.003 N hydrochloric acid containing 0.02 M sodium chloride. The eluate is allowed to pass through a column packed with 15 parts by weight of activated carbon. The column is washed with water and is subjected to elution with 150 parts by volume of the above-mentioned mixture of ethyl alcohol, 28% aqueous ammonia and water. The elute is concentrated under reduced pressure to 20 parts by volume. To the concentrate is added a solution of 0.5 part by weight of calcium chloride in 20 parts by volume of ethyl alcohol to precipitate calcium 2 - (3-methylbut-2-enylthio)inosine-5'-phosphate as a white powder. The yield is 1.24 parts by weight.

*Elementary analysis.*—Calculated for $C_{15}H_{19}N_4O_8$ PSCA·1.5H₂O (percent): C, 35.08; H, 4.32; N, 10.91; P, 6.04. Found (percent): C, 35.17; H, 4.55; N, 10.63; P, 5.79.

Ultraviolet absorption:

$$\lambda_{\min.}^{0.1\,N\,HCl}\ 275\ m\mu\ (\epsilon\ 17{,}600)$$

$$\lambda_{\min.}^{0.1\,N\,HCl}\ 242\ m\mu$$

$$\lambda_{\max.}^{H_2O}\ 264\ m\mu\ (\epsilon\ 14{,}600),\ 283\ m\mu\ (\text{shoulder})$$

$$\lambda_{\min.}^{H_2O}\ 263\ m\mu$$

$$\lambda_{\max.}^{0.1\,N\,NaOH}\ 273\ m\mu\ (\epsilon\ 15{,}800),\ 227.5\ m\mu\ (\epsilon\ 22{,}500)$$

$$\lambda_{\min.}^{0.1\,N\,NaOH}\ 248\ m\mu$$

This product gives a single ultraviolet absorption spot at a migration distance of 9 times that of 2-(3-methyl-but-2-enylthio)inosine in paper electrophoresis (0.05 M phosphate buffer, pH 7.5) and gives a single ultraviolet absorption spot at Rf. 0.54 in paper chromatography (developer: a mixture of isopropyl alcohol, 28% aqueous ammonia and water (7:1:2 by volume), ascending method).

To a suspension of 1.5 parts by weight of this product in 100 parts by volume of water there is added 10 parts by volume of Na⁺ type of Amberlite IR–120 (trademark) and the mixture is kept standing while stirring at room temperature for 30 minutes. The resin is removed from the mixture and the resulting solution is subjected to evaporation to dryness. The resultant residue is recrystallized from 5 parts by volume of a mixture of water and methyl alcohol (2:3 by volume) to give the crystals of disodium 2-(3-methylbut-2-enylthio)inosine-5'-phosphate.

Example 3

To a solution of 12 parts by weight of potassium 2-mercaptoinosine in a mixture of 90 parts by volume of water and 30 parts by volume of methyl alcohol is added 6 parts by weight of 1-chloro-2-butene and the mixture is kept standing while stirring at room temperature for 18 hours to give crystals. The crystals are recrystallized from 100 parts by volume of ethyl alcohol to yield colorless needles of 2-(but-2-enylthio)inosine melting at 191°–193° C. The yield is 8 parts by weight.

4 parts by weight of the thus prepared 2-(but-2-enylthio)inosine is suspended in 450 parts by volume of acetonitrile. Into the resultant suspension is added dropwise with stirring and ice-cooling (0°–10° C.) 6 parts by volume of pyrophosphoryl tetrachloride.

The reaction mixture is poured into 2,500 parts by volume of ice water and is adjusted to pH 2 with 4 N sodium hydroxide. In accordance with the procedure described in Example 2, the mixture is treated with 60 parts by weight of activated carbon, subjected to column chromatography employing 500 parts by volume of diethylaminoethyl cellulose (Cl⁻ type) and then again treated with 60 parts by weight of activated carbon.

The resultant solution (500 parts by volume) is concentrated under reduced pressure to 50 parts by volume. The concentrate is allowed to pass through a column packed with 20 parts by volume of H⁺ type of Amberlite IR–120 (trademark). The effluent is adjusted to pH 8.5 with 4 N sodium hydroxide and is admixed with 200 parts by volume of ethyl alcohol to yield disodium 2-(but-2-enylthio)inosine-5'-phosphate as a white powder. The yield is 3.7 parts by weight.

*Elementary analysis.*—Calculated for $C_{14}H_{17}N_4O_8PSNa_2 \cdot 1.5H_2O$ (percent): C, 33.31; H, 3.96; N, 11.12; P, 6.14; S, 6.34. Found (percent): C, 33.55; H, 4.25; N, 10.98; P, 6.43; S, 6.24.

Specific rotation:

$$[a]_D^{23} = -15.5° \text{ (C.=1. water)}$$

Ultraviolet absorption:

$$\lambda_{max.}^{0.1\,N\,HCl} \; 271 \text{ m}\mu \; (\epsilon \; 16,000)$$

$$\lambda_{min.}^{0.1\,N\,HCl} \; 240 \text{ m}\mu$$

$$\lambda_{max.}^{H_2O} \; 262 \text{ m}\mu \; (\epsilon \; 14,400), \; 280 \text{ m}\mu \text{ (shoulder)}$$

$$\lambda_{min.}^{H_2O} \; 236 \text{ m}\mu$$

$$\lambda_{max.}^{0.1\,N\,NaOH} \; 272 \text{ m}\mu \; (\epsilon \; 15,300), \; 227 \text{ m}\mu \; (\epsilon \; 20,400)$$

$$\lambda_{min.}^{0.1\,N\,NaOH} \; 246 \text{ m}\mu$$

This product gives a single ultraviolet absorption spot at a migration distance of 0.82 time that of 5'-inosinic acid in paper electrophoresis (0.05 M phosphate buffer, pH 7.5).

Example 4

To a solution of 12 parts by weight of potassium 2-mercaptoinosine in a mixture of 120 parts by volume of water and 20 parts by volume of methyl alcohol, is added 4 parts by weight of 1-chloro-2-methyl-2-propene and the mixture is kept standing while stirring at room temperature for 18 hours to give crystals. The crystals are recrystallized from 30 parts by volume of ethyl alcohol to yield colorless cubic crystals of 2-(methylprop-2-enyl-thio)inosine melting at 179°–180° C. The yield is 11 parts by weight.

4 parts by weight of the thus prepared 2-(2-methyl-prop-2-enylthio)inosine is suspended in 480 parts by volume of acetonitrile. Into the resultant suspension is added dropwise with stirring and ice-cooling (0°–10° C.) 6 parts by volume of pyrophosphoryl tetrachloride. The mixture is kept standing while stirring at the same temperature for 2 hours.

The reaction mixture is poured into 2,500 parts by volume of ice water and is adjusted to pH 2 with 4 N-sodium hydroxide. In accordance with the procedure described in Example 1, the mixture is treated with 60 parts by weight of activated carbon, then subjected to column chromatography employing 500 parts by volume of diethylaminoethyl cellulose (Cl⁻ type), followed by re-treatment with 60 parts by weight of activated carbon.

The resultant solution (500 parts by volume) is concentrated under reduced pressure to 50 parts by volume. The concentrate is allowed to pass through a column packed with 20 parts by volume of H⁺ type of Amberlite IR–120. The effluent is adjusted to pH 8.5 with 4 N sodium hydroxide and is subjected to evaporation dryness. The resulting residue is dissolved in a mixture of 20 parts by volume of water and 60 parts by volume of methyl alcohol. The solution is kept standing at 5° C. for 12 hours to yield colorless needles of disodium 2-(2-methylprop-2-enylthio)inosine-5'-phosphate. The yield is 4.2 parts by weight.

*Elementary anaylsis.*—Calculated for $$C_{14}H_{17}N_4O_8PSNa_2 \cdot 2H_2O$$

(percent): C, 32.68; H, 4.09; N, 10.51; P, 6.23; S, 6.03. Found (percent): C, 32.49; H, 4.39; N, 10.81; P, 6.53; S, 6.13.

Specific rotation:

$$[\alpha]_D^{23} = -12.7° \text{ (C.=1.0, water)}$$

Ultraviolet absorption:

$$\lambda_{max.}^{H_2O} \; 262 \text{ m}\mu \; (\epsilon \; 14,200), \; 280 \text{ m}\mu \text{ (shoulder)}$$

$$\lambda_{min.}^{H_2O} \; 235 \text{ m}\mu$$

$$\lambda_{max.}^{0.1\,N\,HCl} \; 270 \text{ m}\mu \; (\epsilon \; 15,600)$$

$$\lambda_{min.}^{0.1\,N\,HCl} \; 239 \text{ m}\mu$$

$$\lambda_{max.}^{0.1\,N\,NaOH} \; 271 \text{ m}\mu \; (\epsilon \; 15,200), \; 226.5 \text{ m}\mu \; (\epsilon \; 19,300)$$

$$\lambda_{min.}^{0.1\,N\,NaOH} \; 246 \text{ m}\mu, \; 214 \text{ m}\mu$$

This product gives a single ultraviolet absorption spot at a migration distance of 0.82 time that of 5'-inosinic acid in paper electrophoresis (0.05 M phosphate buffer, pH 7.5) and gives a single absorption spot at Rf 0.26 in paper chromatography (developer: a mixture of n-propyl alcohol, 28% aqueous ammonia and water, ascending method).

Example 5

0.5 part by weight of disodium 2-allylthioinosine-5'-phosphate, 1,000 parts by weight of table salt, 600 parts by weight of sugar, 30 parts by weight of citric acid, 200 parts by weight of hydrolyzed vegetable protein, 300 parts by weight of monosodium glutamate, 2 parts by weight of onion powder, 2 parts by weight white pepper and 100 parts by weight of vegetable shortening are homogeneously mixed to give about 2,000 parts by weight of powdery soup composition.

1 part by weight of this composition is dissolved in 50 parts by volume of hot water to give a flavor-enhanced soup.

Example 6

To 2,000 parts by weight of powdered monosodium glutamate is gradually added a solution of 30 parts by weight of disodium 2-allylthioinosine-5'-phosphate in 150 parts by volume of water. The mixture is kneaded, granulated, dried and sieved to give a granular seasoning composition.

This composition has excellent ability to enhance and improve the flavor of, for example cream soup, when added thereto in the range of from about 0.05 to about 0.2% by weight.

Example 7

To 8,000 parts by weight of fish paste containing 80% of water are added 250 parts by weight of sodium chloride, 30 parts by weight of monosodium glutamate and 0.5 part by weight of disodium 2-allylthioinosine-5'-phosphate and the mixture is kneaded. To the mixture there is added 1,000 parts by weight of lard, 350 parts by weight of potato starch and 400 parts by weight of wheat starch and the whole mixture is mingled thoroughly. The resultant paste is packed in a casing. The resultant raw fish sausages are boiled at 85° to 90° C. for 1 hour to give flavor-enhanced fish sausages.

Example 8

Raw soy sauce prepared by the conventional method is sterilized. To 2,000 parts by volume of the thus treated soy sauce, there is uniformly added 0.1 part by weight disodium 2-allylthioinosine-5'-phosphate to give a flavor-enhanced soy sauce.

Example 9

0.5 part by weight of disodium 2-(but-2-enylthio)inosine-5'-phosphate, 1,200 parts by weight of table salt, 250 parts by weight of sugar, 70 parts by weight of citric acid, 200 parts by weight of hydrolyzed vegetable protein, 300 parts by weight of monosodium glutamate, 10 parts by weight of onion powder, 5 parts by weight of garlic powder, 10 parts by weight of powdered carrot, 5 parts by weight of powdered celery and 5 parts by weight of white pepper are homogeneously mixed to give about 2,000 parts by weight of powdery soup composition.

1 part by weight of this composition is dissolved in 50 parts by volume of hot water to give a flavor-enhanced clear soup.

Example 10

0.5 part by weight of disodium 2-(2-methylprop-2-enylthio)inosine-5'-phosphate, 1,000 parts by weight of table salt, 450 parts by weight of sugar, 200 parts by weight of hydrolyzed vegetable protein, 400 parts by weight of monosodium glutamate, 20 parts by weight of curry powder, 3,000 parts by weight of skimmed milk powder, 40 parts by weight of powdered butter and 5,000 parts by weight of powdered roux are homogeneously mingled to give powdery soup composition.

1 part by weight of this composition is dissolved in 10 parts by volume of water, followed by boiling for 5 minutes to give a flavor-enhanced curry cream soup.

Example 11

To 2,000 parts by weight of powdered monosodium glutamate is added a solution of 30 parts by weight of calcium 2-(3-methylbut-2-enylthio)inosine-5'-phosphate in 150 parts by volume of water. The whole mixture is kneaded, granulated, dried and sieved to give a granular seasoning composition.

This composition has excellent ability to enhance and improve the flavor of, for example clear soup, with its addition thereto in a range of from about 0.05 to about 0.2%.

Example 12

9,000 parts by weight of table salt is charged into a fluidizing coating apparatus. The temperature of the blowing air is between 120° and 150° C. A solution of 4 parts by weight of disodium 2-(2-methylprop-2-enylthio)inosine-5'-phosphate and 996 parts by weight of monosodium glutamate in 2,000 parts by volume of water is applied to the fluidizing table salt in a tower by spraying the solution uniformly over the salt. The water is evaporated rapidly with the blowing air to give flavor-enhanced table salt.

Example 13

Raw soy sauce prepared by the conventional method is sterilized. To 2,000 parts by volume of the thus treated soy sauce is uniformly added 0.1 part by weight of disodium 2-(but-2-enylthio)inosine-5'-phosphate to give a flavor-enhanced soy sauce.

Example 14

Bean paste (Miso) prepared by the conventional method is heated at 85° to 90° C. to inactivate phosphatase therein. To 10,000 parts by weight of the thus treated bean paste is uniformly added a solution of 0.3 part by weight of calcium 2-(3-methylbut-2-enylthio)inosine-5'-phosphate in 100 parts by volume of water to give a flavor-enhanced bean paste.

Example 15

To 100,000 parts by volume of Worcestershire sauce prepared by the conventional method is uniformly added 5 parts by weight of disodium 2-(but-2-enylthio)inosine-5'-phosphate to give a flavor-enhanced Worcestershire sauce.

Example 16

Raw tomato juice is prepared by the conventional method. To 10,000 parts by volume of the tomato juice are added 120 parts by weight of sugar, 50 parts by weight of table salt, 10 parts by weight of monosodium glutamate and 0.01 part by weight of disodium 2-(2-methylprop-2-enylthio)inosine-5'-phosphate and the mixture is sterilized to give a flavor-enhanced tomato juice.

What is claimed is:

1. A 2-(alk-2-enylthio)inosine-5'-phosphate having an alk-2-enyl group of the formula

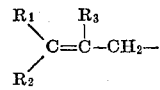

wherein each of $R_1$, $R_2$ and $R_3$ is a hydrogen atom or a methyl group.

2. A 2-(alk-2-enylthio)inosine-5'-phosphate according to claim 1, wherein the phosphate is in the form of a non-toxic physiologically acceptable salt.

3. A 2-(alk-2-enylthio)inosine-5'-phosphate according to claim 2, wherein the non-toxic physiologically acceptable salt is a sodium salt.

4. A 2-(alk-2-enylthio)inosine-5'-phosphate according to claim 1, wherein the alk-2-enyl group is an allyl group.

5. A 2-(alk-2-enylthio)inosine-5'-phosphate according to claim 1, wherein the alk-2-enyl group is a 3-methylbut-2-enyl group.

6. A 2-(alk-2-enylthio)inosine-5'-phosphate according to claim 1, wherein the alk-2-enyl group is a but-2-enyl group.

7. A 2-(alk-2-enylthio)inosine-5'-phosphate according to claim 1, wherein the alk-2-enyl group is a 2-methylprop-2-enyl group.

8. A 2-(alk-2-enylthio)inosine having an alk-2-enyl group of the formula

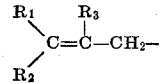

wherein each of $R_1$, $R_2$ and $R_3$ is a hydrogen atom or a methyl group.

9. A 2-(alk-2-enylthio) - 2',3' - isopropylideneinosine having an alk-2-enyl group of the formula

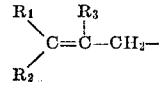

wherein each of $R_1$, $R_2$ and $R_3$ is a hydrogen atom or a methyl group.

References Cited

UNITED STATES PATENTS

| 3,074,930 | 1/1963 | Hitchings et al. | 260—211.5 R |
| 3,176,005 | 3/1965 | Hitchings et al. | 260—211.5 R |
| 3,408,206 | 10/1968 | Yamazaki et al. | 260—211.5 R |

LEWIS GOTTS, Primary Examiner

J. R. BROWN, Assistant Examiner

U.S. Cl. X.R.

99—140 N